United States Patent [19]

Murase et al.

[11] Patent Number: 4,972,468

[45] Date of Patent: Nov. 20, 1990

[54] TRANSCEIVER FOR HANGING ON AN EAR

[75] Inventors: Masaji Murase; Saburo Ito, both of Hamamatsu, Japan

[73] Assignee: Sanshin Kogyo Kabushiki Kaisha, Nippashi, Japan

[21] Appl. No.: 257,465

[22] Filed: Oct. 13, 1988

[30] Foreign Application Priority Data

Oct. 14, 1987 [JP] Japan ................. 62-259036

[51] Int. Cl.$^5$ ............. H04B 1/38; H04R 1/10
[52] U.S. Cl. .................... 379/430; 381/169; 381/187
[58] Field of Search ............ 379/430; 381/68.7, 169, 381/183, 187, 151; 455/89, 90

[56]  References Cited

U.S. PATENT DOCUMENTS

| | | | |
|---|---|---|---|
| D. 117,003 | 10/1939 | Woodruff et al. | 381/151 |
| 2,136,720 | 11/1938 | White | 381/151 |
| 2,470,933 | 5/1949 | Knowles | 381/151 |
| 2,641,327 | 6/1953 | Balmer | 381/187 |
| 2,773,941 | 12/1956 | Christiansen | 381/151 |
| 3,098,127 | 7/1963 | Huth | 381/169 |
| 3,610,841 | 10/1971 | Hutchings | 379/430 |
| 3,691,319 | 9/1972 | Bee | 379/430 |
| 3,826,987 | 7/1974 | Stevens | 381/187 |
| 3,862,378 | 1/1975 | Norris | 379/430 |
| 3,869,584 | 3/1975 | Wilde | 379/430 |
| 4,273,969 | 6/1981 | Foley et al. | 379/430 |
| 4,529,058 | 7/1985 | Emery | 381/187 |
| 4,591,668 | 5/1986 | Iwata | 381/151 |
| 4,654,883 | 5/1987 | Iwata | 379/430 |
| 4,791,673 | 12/1988 | Schreiber | 381/151 |

FOREIGN PATENT DOCUMENTS

| | | | |
|---|---|---|---|
| 436377 | 10/1926 | Fed. Rep. of Germany | 381/187 |
| 60-10999 | 1/1985 | Japan | 381/187 |
| 299574 | 11/1928 | United Kingdom | 379/430 |
| 1377237 | 12/1974 | United Kingdom | 381/187 |

OTHER PUBLICATIONS

Pence's Complete Specification 126,284 published in Illustrated Official Journal, May 14, 1919.
Telex Earset Specification Sheet, Form 381006, Apr. 14, 1950.
"Helmet Radio: For Rappin' on the Road", *Popular Science*, Mar. 1974, p. 32.
"Teleconnect", Secrette Headset, p. 98.

*Primary Examiner*—Jin F. Ng
*Assistant Examiner*—M. Nelson McGeary, III
*Attorney, Agent, or Firm*—Ernest A. Beutler

[57]  ABSTRACT

Several embodiments of transceivers including an earphone and a microphone carried by a mounting device that is adapted to be mounted on the ear of the user. The mounting device resiliently biases the earphone into engagement with the auditory canal of the user so as to improve sound transmission. A number of arrangements of mounting of the microphone and shielding from noise are shown and described.

5 Claims, 14 Drawing Sheets

TRANSCEIVER FOR HANGING ON AN EAR

BACKGROUND OF THE INVENTION

This invention relates to a transceiver for hanging on an ear and more particularly to an improved transceiver that can be worn on the body of an individual.

In many instances, there are cases when it is desirable to permit an individual to wear a transceiver directly on his body. Such applications are particularly useful in outdoor sports such as water or snow skiing, hunting or the like. Although the advantages of body worn transceivers are many, in order to be practical, the device must be not only comfortable but must also be mounted in such a way that it or parts of it cannot be easily disengaged from the body of the user during these sporting activities.

For example, it is possible to have the earphone mounted in a position to register with the auditory canal so as to permit good hearing. In addition, the microphone can be mounted either in proximity to the individual's mouth or in contact with a part of has body such as his head in order to pick up the sound waves emanated by his speaking and transmit them. In addition, an amplifier receiver arrangement should be incorporated that will receive, amplify and transmit signals to and from the transceiver. It is important that all of these components can be mounted conveniently and yet securely. Also in sporting use such as skiing or the like, it is important that wind noises not adversely affect performance. The prior art devices proposed for this purpose have not been as convenient or as foolproof as is desired.

It is, therefore, a principal object of this invention to provide an improved body worn transceiver, particularly adapted for sporting use.

It is a further object of this invention to provide an improved arrangement for mounting either or both the earphone and/or microphone of a transceiver on the head of an individual in a comfortable and yet secure manner and which will reduce noise interference.

SUMMARY OF THE INVENTION

A first feature of this invention is adapted to be embodied in a transceiver for use by an individual and adapted to be worn on the individual's person. The transceiver comprises an earphone that is adapted to emit sound and means for mounting the earphone in registry with the auditory canal of the individual. The mounting means is comprised of a first portion that extends across the outer portion of the outer ear and which carries the earphone directly. A second portion is connected to the first portion and is adapted to extend across the back portion of the outer ear for retaining the earphone in registry with the auditory canal. A microphone is also carried by the mounting means and is held in engagement with a portion of the head of the individual for picking up sounds emanated when the individual speaks.

In accordance with another feature of the invention, the microphone is held in engagement with rear portion of the individual's head to be shielded from external wind noise.

DETAILED DESCRIPTION OF THE PREFERRED EMBODIMENTS

Figure 1:
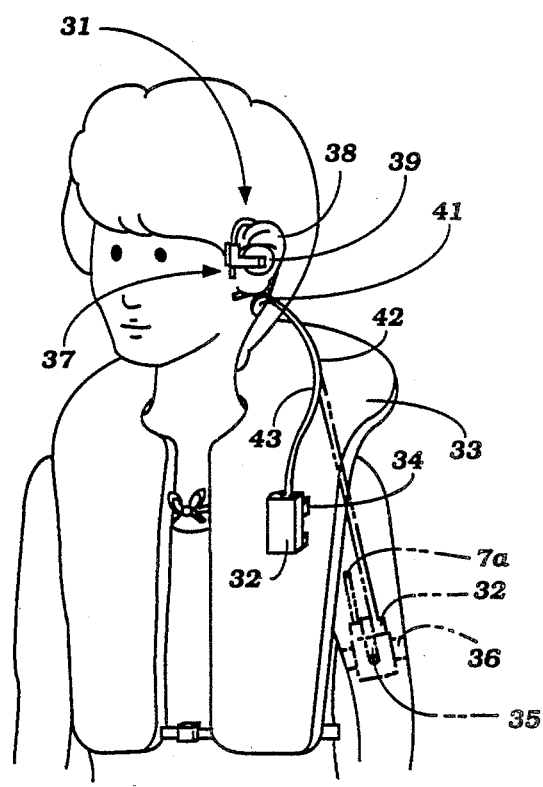
FIG. 1 is a perspective view of an individual wearing a transceiver constructed in accordance with a first embodiment of the invention.

Referring first to FIG. 1, an individual is depicted as wearing a transceiver constructed in accordance with an embodiment of this invention, which transceiver is identified generally by the reference numeral 31. The transceiver 31 includes a combined receiving and sending unit 32 which is, in the illustrated embodiment, adapted to be affixed to a life jacket 33 worn by the user by means of detachable fasteners 34 which may be of the hook and loop type, snap type or any other type. The receiver, transmitter 32 can be of any known type and basically its construction and operation forms no part of the invention. Alternatively to the mounting on the life jacket 33, the transmitter, receiver 32 may be mounted on an arm of the wearer by means of a holder 35 and belt 36. Such an alternative mounting arrangement is shown is phantom lines in FIG. 1.

The invention deals particularly with the earphone and microphone portions of the transceiver 31, which are comprised of an assembly indicated generally by the reference numeral 37 and which is adapted to be mounted on the ear 38 of the user in a manner to be described. The assembly 37 includes an earphone 39 that is mounted in registry with the auditory canal of the user and a microphone 41 that is adapted to be held in engagement with the head of the user so as to pick up sound waves emanating from the vibration of the head generated during talking. The microphone 41 and earphone 39 are connected to the transmitter, receiver 32 by respective conductors 42 and 43 so that the spoken words will be transmitted by the transmitter, receiver 32 and received messages will be made audible to the wearer by the earphone 39.

Figure 2:
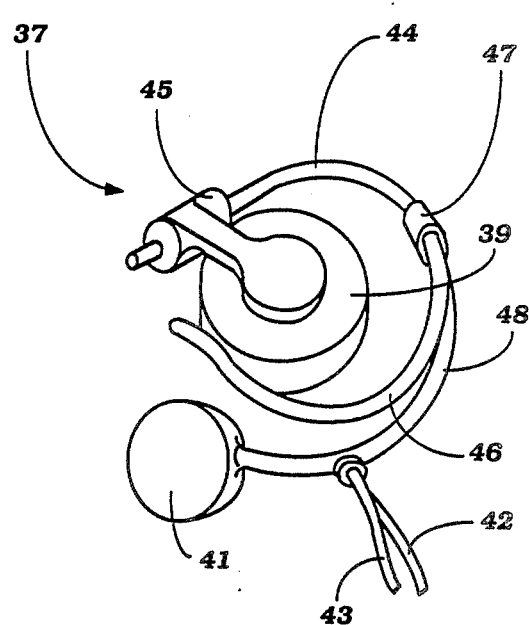
FIG. 2 is an enlarged perspective view of the microphone, earphone portion of the transceiver and its mounting arrangement.
Figure 3:
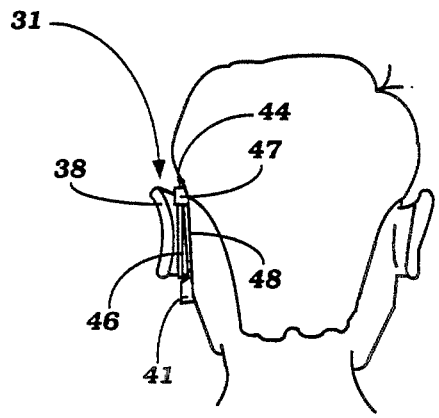
FIG. 3 is a rear elevational view showing the mounting of the embodiment on the individual's ear.

Referring now is greater detail to FIG. 2 and 3, the mounting device will be described in detail. This mounting device is comprised of a pair of resilient members including a first generally arcuate shape member or arm 44 which may be formed of a wire core with a surrounding protective elastic material. The earphone 39 has a mounting portion 45 that is slidably supported upon the arm 44 so that the operator may position the earphone 38 in registry with his auditory canal. The resilient arm 44 includes a second portion or arm 46 that is adapted to lie on the rear side of the wearer's ear 38 with the biasing of the arms 44 and 46 being such that the earphone will be held in close registry with the wearer's outer ear and specifically has auditory canal. It should be noted that the arm 44 overlies the wearer's outer ear and specifically the outer surface of it as does the mounting arrangement for the earphone 39. As a result, the device will be comfortably and yet snugly held to the wearer's ear.

There is provided a connecting member 47 at the juncture between the arms 44 and 46 from which a third arm 48 extends. The third arm portion 48 is also resilient and is biased inwardly toward the side of the wearer's head. The microphone 41 is carried at the outer end of the arm 48 and will be pressed against the rider's skull through the skin so as to provide good pickup of sounds emanated when the weaver speaks. The wires 42 and 43 pass through the arms 48 and 44 so as to transmit electrical signals between the microphone 41, earphone 39 and transmitter, receiver 32 for transmitting the sounds.

Figure 4:
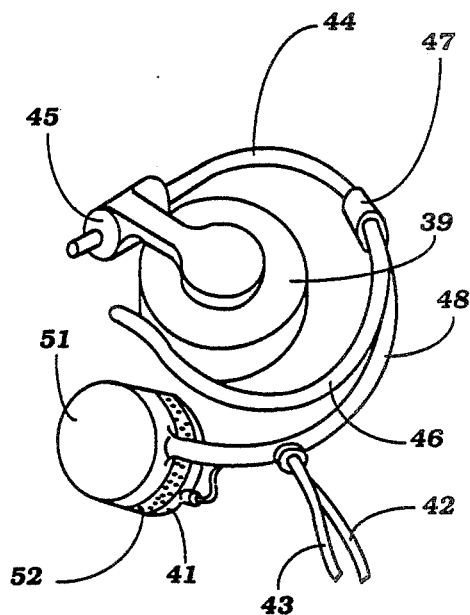
FIG. 4 is a perspective view, in part similar to FIG. 2, showing another embodiment of the invention.
Figure 5:
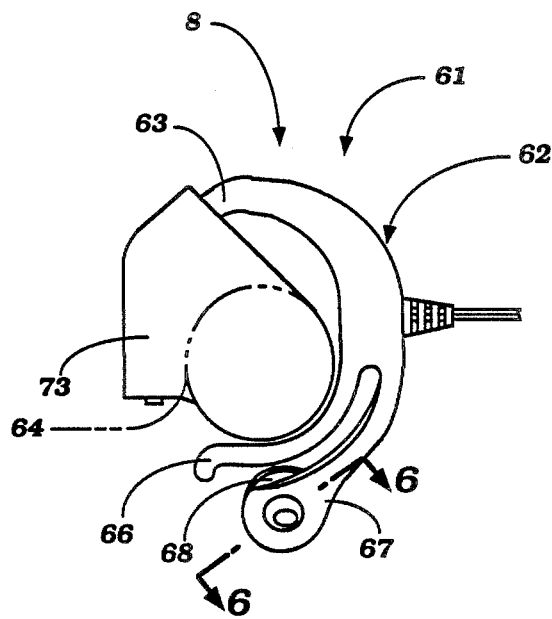
FIG. 5 is a side elevational view showing another embodiment of the invention.

FIG. 4 shows another embodiment of the invention which is similar to the embodiment of FIG. 1 through 3 and only differs in the method of mounting the microphone 41 on the end of the arm 48. Because of the other similarities of this embodiment to the previously described embodiment, those components which are the same have been identified by the same reference numerals and will not be described again, except insofar as may be necessary to understand the construction and operation of this embodiment.

In this embodiment, the arm 48 has affixed to its end a generally annular member 51 that is complementary in configuration to the microphone 41. The microphone 41 is carried by the annular member 51 by means of an elastic or sponge like cylindrical body 52 so as to be continuously pressed against the wearer's head. Thus, the element 52 adds to the resilience of the arm 48 and insures a good and yet unobjectionable contact, The elastic member 52 will also dampen any unwanted sounds from external sources.

FIG. 5 through 8 show another embodiment of the invention which is generally similar to the previously described embodiment but differs in respects which will be described. In this embodiment, the head assembly is indicated generally by the reference numeral 61 and includes a mounting portion, indicated generally by the reference numeral 62, and which may be formed from a molded resilient plastic. This portion has a first arm 63 that carries an earphone 64 in proximity to the auditory canal 65 of the wearer's ear 38 (FIG. 8). a further arm 66 is disposed on the rear side of the wearer's outer ear, as clearly shown in FIG. 7, and serves to operate with the arm 63 so as to hold the unit in place and still be comfortable to the wearer.

There is provided a further arm 67 that extends somewhat parallel to the arm 66 but is offset so as to hold a microphone 68 carried by the arm 67 in a manner to be described against the wearer's head.

Figure 6:
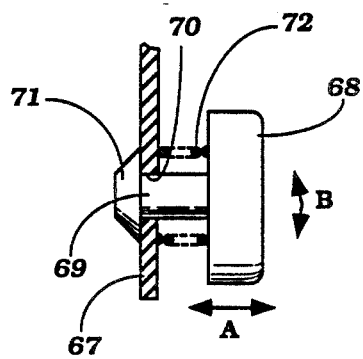
FIG. 6 is an enlarged cross-sectional view taken along the line 6—6 of FIG. 5 and shows the mounting of the microphone of this embodiment.
Figure 7:
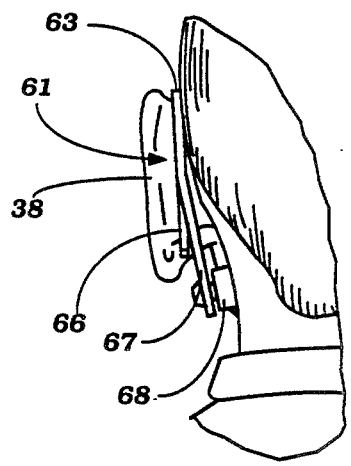
FIG. 7 is a rear elevational view, in part similar to FIG. 3, showing how this embodiment is mounted on the user's ear.

Referring to FIG. 6, it will be noted that the arm 67 is provided with an aperture 70 in which a pin 69 affixed to the microphone 68 is slidably and tiltably received. The pin 69 has a headed portion 71 and a coil compression spring 72 engages the arm 67 and urges the microphone 68 outwardly into engagement with the wearer's head. The construction is such that the microphone 68 be moved in and out in the direction A indicated in FIG. 6 and may also pivot in a universal manner about the arc B.

Figure 8:
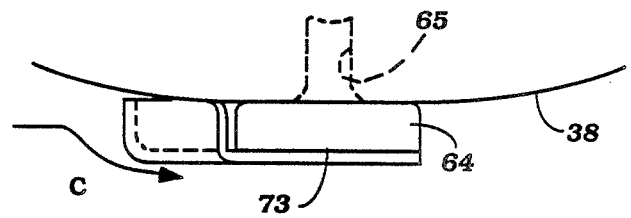
FIG. 8 is a top plan view looking in the direction of the arrow 8 in FIG. 5.

In order to prevent the transmission of noises from air flow during sporting movements or other occurrences, there is provided an air flow shield 73 that is affixed to the arm 63 in an appropriate manner and which overlies the earphone 64 as clearly shown in FIG. 8. As shown in this figure, the air flow C will be deflected by the air shield 73 and reduce extraneous noises. In this embodiment, the earphone 64 is mounted directly from the air shield 73.

Figure 9:
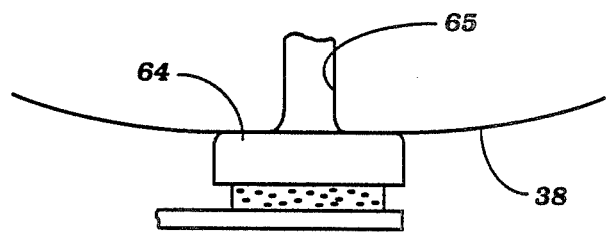
FIG. 9 is a view generally similar to FIG. 8 but shows another embodiment of the invention and way for deadening extraneous sounds.

FIG. 9 shows another embodiment of the invention which is generally similar to the embodiment of FIG. 5 through 8 and and differs from it only in the manner in which the earphone 64 is mounted. For that reason, only this portion of the construction has been illustrated and will be described.

This embodiment generally bear the same relationship to FIGS. 5 through 8 as the embodiment of FIG. 4 bears to the embodiment of FIGS. 1 through 3. That is, in this embodiment, the earphone 64 is resiliently biased against the open end of the auditory canal by means of a resilient elastomer element 81 in addition to the biasing of the arm 63. As with the previously described embodiment, the earphone 64 is actually carried by the air shield 73 which is, in turn, carried by the arm 63. In all other regards, this embodiment is the same and further description of it is not believed to be necessary.

Figure 10:
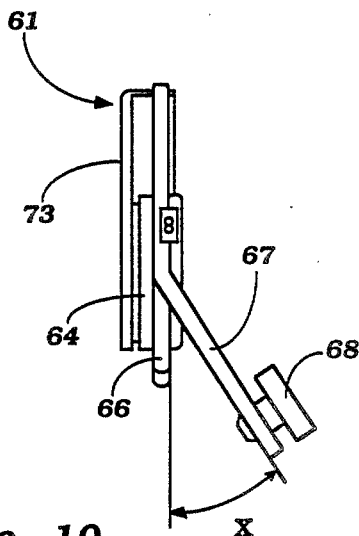
FIG. 10 is a rear elevational view of this embodiment and showing the resilient biasing of the microphone when the device is not being worn.
Figure 11:
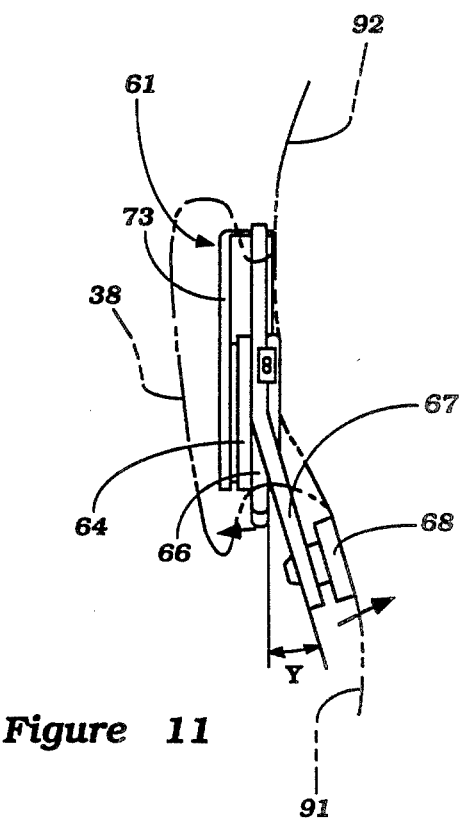
FIG. 11 is a rear elevational view, in part similar to FIG. 10, showing the deflection of the resilient mounting when being worn by a user.
Figure 12:
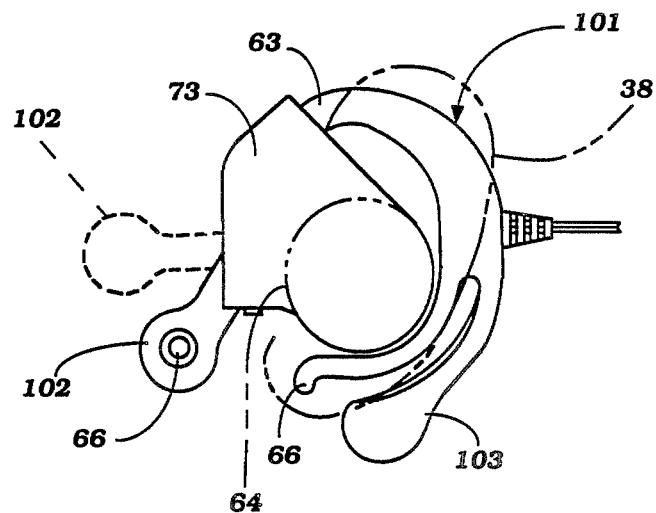
FIG. 12 is a side elevational view of another embodiment of the invention.
Figure 13:
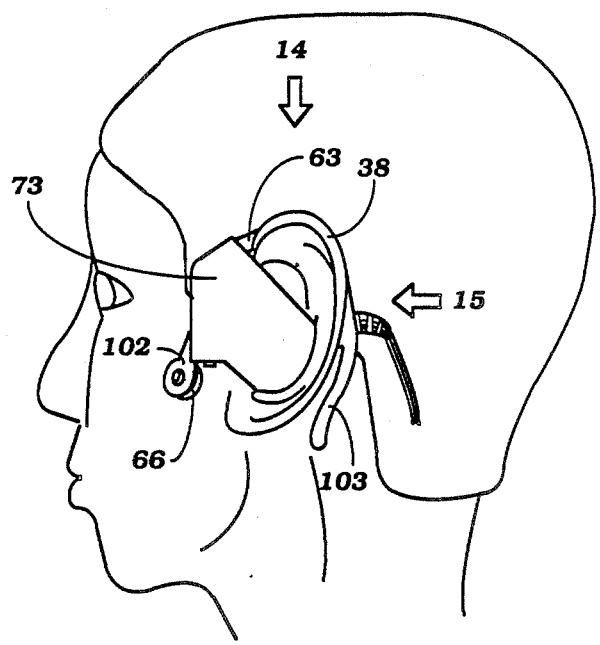
FIG. 13 is a side elevational view of this embodiment shown as being worn by a user.
Figure 14:
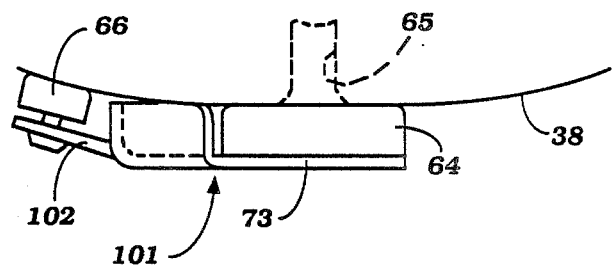
FIG. 14 is a top plan view looking in the direction of the arrow 14 in FIG. 13.
Figure 15:
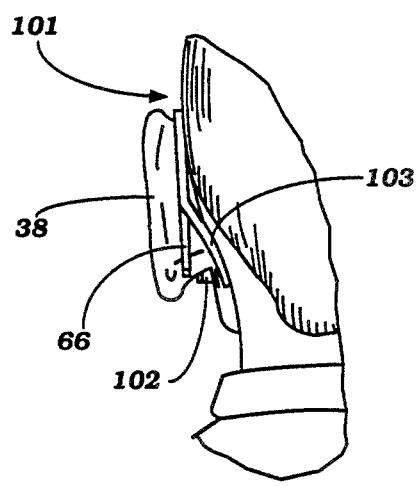
FIG. 15 is a rear elevational view looking in the direction of the arrow 15 in FIG. 13.

FIG. 10 and 11 shows how the resilience of the arm 67 is useful in maintaining the bias of the microphone 68 against a side 91 of the user's head 92. It will be noted that in the unstressed condition before the user places the unit 61 on his head, the arm 67 forms an angle X with the arm 66. When, however, the user places the unit 61 on his head, the arm 67 will be deflected and will only make the angle Y with the arm 66. Therefore, the arm is under a resilient bias and will hold the microphone 68 against the wearer's head. The mounting arrangement shown in FIG. 6 will add still further to the resiliency to insure a good fit relationship and insure that the sound waves created by the rider's speaking will be transmitted to the microphone 68, the rearward placement is also effective in reducing interference from external sources, as will become apparent.

In the embodiments of the invention as thus far described, the microphone has been positioned below and slightly to the rear of the wearer's auditory canal. Although this arrangement is particularly useful, it may in some instances desirable to mount the device in such a way that the microphone will be positioned in contact with the wearer's cheekbone. FIGS. 12 through 15 show such an embodiment wherein the headpiece is identified generally by the reference numeral 101. The mounting of the earphone and the construction of it may be substantially the same as the embodiment of FIG. 5 through 8 and of FIG. 9 and, for that reason, these components of the assembly have been identified by the same reference numerals and reference may be had to the foregoing description for their construction and operation.

In this embodiment, the arm 63 has a forwardly extending portion 102 from which the microphone 66 may be mounted either directly or by means of a construction as shown in FIG. 6. The arm portion 102 may extend downwardly as shown in solid lines in this figure or forwardly as shown in phantom lines. Actually, the configuration of the arm portion 63 may be such so as to permit the microphone 66 to be positioned at the appropriate area to engage the desired portion of the wearer's head.

In order to provide further stability with this embodiment, there is provided a further arm 103 which resiliently engages the lower portion of the wearer's head or neck.

Figure 16:
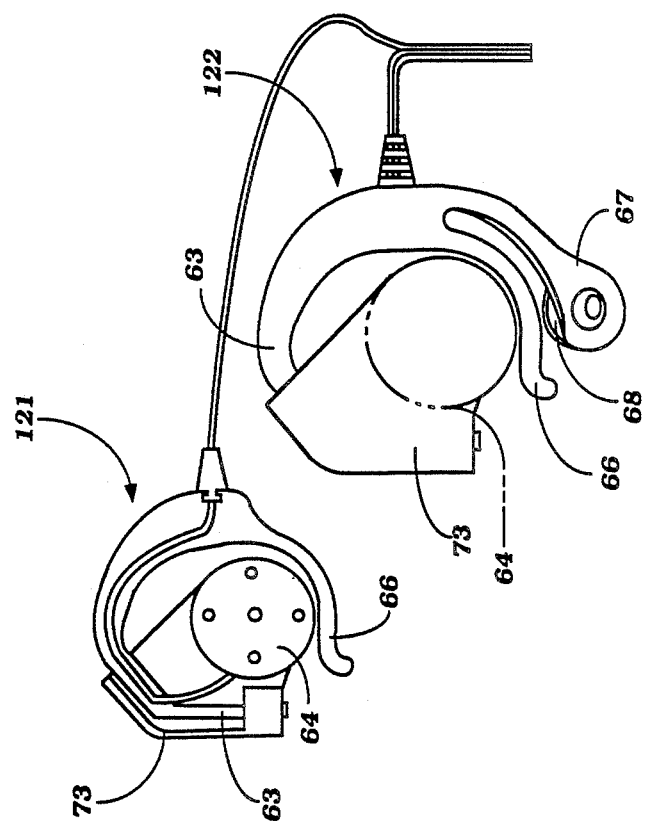
FIG. 16 is a perspective view showing another embodiment of the invention operating in stereo.
Figure 17:
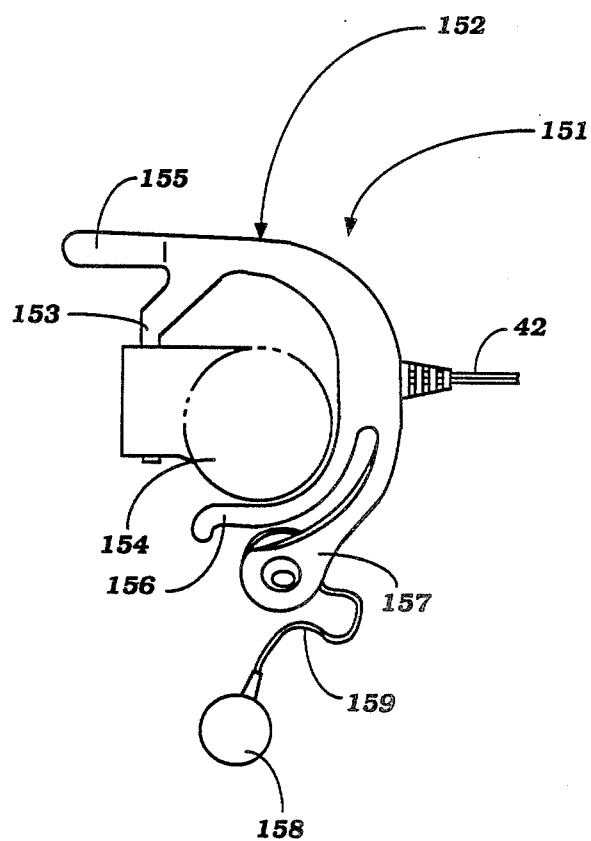
FIG. 17 is a side elevational view of a transceiver constructed in accordance with another embodiment of the invention.
Figure 18:
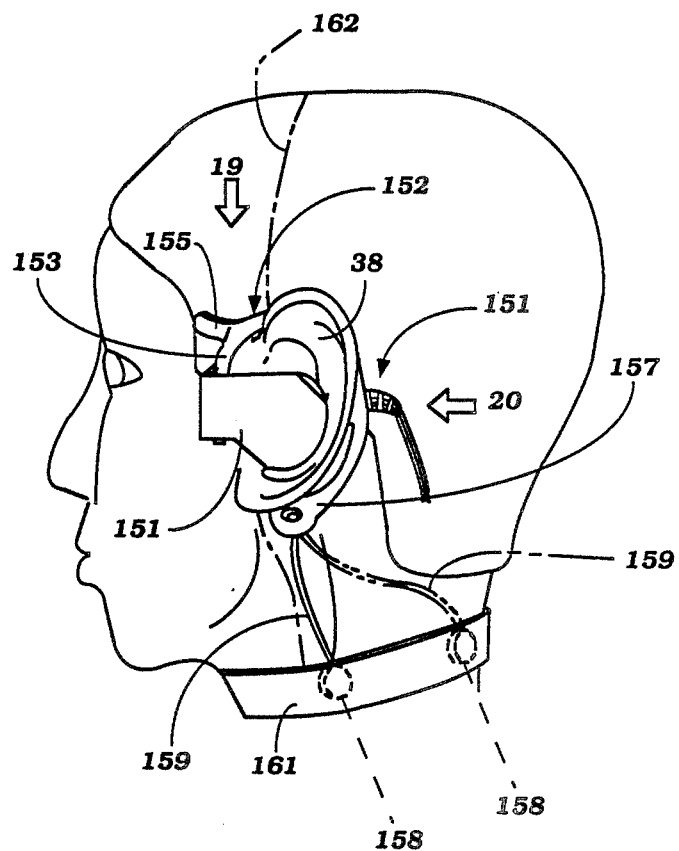
FIG. 18 is a side elevational view of the transceiver of FIG. 17 mounted on the head of an individual.
Figure 19:
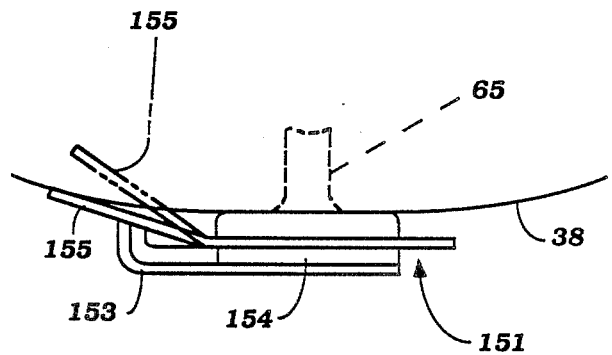
FIG. 19 is a top plan view of this embodiment taken in the direction of the arrow 19 in FIG. 18.
Figure 20:
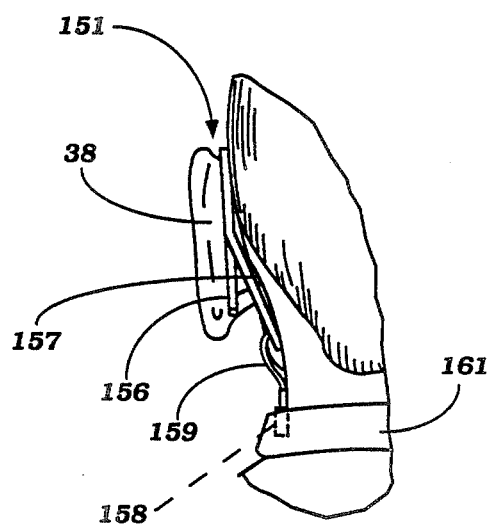
FIG. 20 is a rear elevational view taken in the direction of the arrow 21 in FIG. 19.

In all of the embodiments as thus far described, the headsets have been monaural and have been designed to operate only with a single ear of the user. It should be obvious, however, that a stereo arrangement may be possible and FIG. 16 shows such an arrangement. In this embodiment, there are provided two headsets 121 and 122 which may be identical to each other, except that only one of them need carry the microphone. The construction of the individual headsets may be the same as any of the previously described embodiments and FIG. 16 shows headsets that are the same as the embodiment of FIG. 5 and through 8. However, only the headset 122 carries a microphone, indicated by the reference numeral 68. In all other regards, this embodiment is the same as the previously described embodiment and, for that reason, the components which are the same have been identified by the same reference numeral.

A headphone constructed with yet another embodiment of the invention is illustrated in FIG. 17 through 21 and is identified generally by the reference numeral 151. In accordance with this embodiment, the mounting piece, indicated generally by the reference numeral 152 may be formed from a molded plastic and has a first arm portion 153 from which the earphone 154 is mounted in any of the previously described methods. The arm 153 depends from a forwardly extending arm 155 that is biased and curved so as to engage the head of the user so as to add stability.

There is also provided a further resilient are 156 that underlines the ear 38 of the user so as to hold the earphone 151 in position with the auditory canal of the user in the manners previously described.

In this embodiment, there is provided a further resilient arm 157 that engages the user's head beneath his ear 38. This arm 157 does not directly carry the microphone 158. Rather, the microphone 158 is connected to the arm 157 by means of a wire 159 so as to transmit the signal to the cable 42. However, in this embodiment, the microphone 158 is connected to a strap or belt 161 by some form of detachable connector. The strap 161 may be worn around the neck of the user and by rotating it, the location of the microphone 158 can be adjusted. Preferably, the microphone 158 should be disposed to be rearwardly of a line 162 which separates the front of the user's head from the rear. In this way, the wind noise will be shielded form the microphone as shown in FIG. 21.

Figure 21:
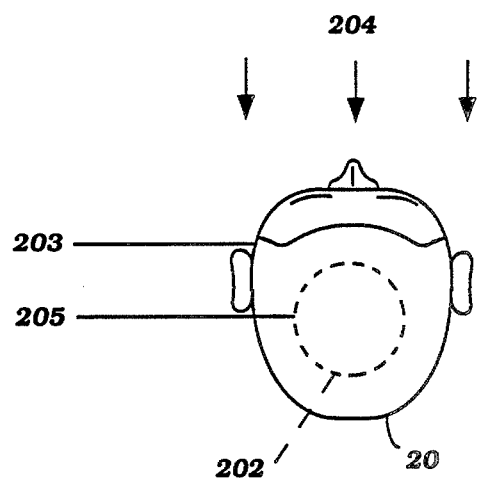
FIG. 21 is a top plan view showing how the location of the microphone on the head of the user can reduce extraneous noises.

Referring to FIG. 21, this figure illustrates how the placement of the microphone on the user's head (either the head per se 201 or the neck 202). As to the head per se 201, there is a line 203 behind which the natural shape of the head provides a shield from air flow indicated by the arrows 204. There is a similar shield line 205 for the neck per se 202. If the microphone is placed in contact with the head per se 201 behind the line 203 or the neck per se 202 behind the line 205, the shape of the head (head per se and/or neck) will provide protection from extraneous air noise.

It should be readily apparent from the foregoing description that a number of embodiment of the invention have been illustrated and described, each of which will provide a very convenient and easily worn headpiece including the microphone and earphone, the microphone and earphone will be held in firm contact with the user but the device is light in weight and not at all objectionable. Although a number of embodiments of the invention have been illustrated and described, various changes and modifications may be made without departing from the spirit and scope of the invention, as defined by the appended claims.

We claim:

1. A transceiver for use by an individual and adapted to be worn on the individual's person comprising an earphone adapted to emit sounds, mounting means for mounting said earphone in registry with the auditory canal of the individual, said mounting means having a first portion extending across the outer portion of the outer ear and carrying the earphone and a resiliently biased second portion adapted to extend across the back portion of the outer ear for resiliently urging said earphone n registry with the auditory canal, and for retaining said transceiver on the users ear, a third resiliently biased portion extending from said first portion to an area of the wearer's head adjacent the ear on which said transceiver is mounted, and a microphone carried by said mounting means third portion and urged thereby in resilient engagement with a portion of the head of the individual for picking up sound from the individual.

2. A transceiver as set forth in claim 1 further including means for shielding air form the earphone.

3. A transceiver as set forth in claim 2 wherein the means for shielding air from the earphone comprises an air shield overlying the earphone for deflecting the air away from the earphone.

4. A transceiver as set forth in claim 1 wherein the microphone engages the head in an area to be shielded from air noise by the shape of the head.

5. A transceiver as set forth in claim 1 further including a further resilient portion affixed to said first portion and engaging the head adjacent the ear and stabilizing the assembly.

* * * * *